Aug. 23, 1927.

F. HUNTAR 1,639,945

SEMIAUTOMATIC CAN CLOSING MACHINE

Filed May 21, 1924    7 Sheets-Sheet 1

INVENTOR.
Felix Huntar
BY Munday, Clarke,
Carpenter ATTORNEYS

Aug. 23, 1927.

F. HUNTAR 1,639,945

SEMIAUTOMATIC CAN CLOSING MACHINE

Filed May 21, 1924    7 Sheets-Sheet 2

INVENTOR.
Felix Huntar
BY Munday, Clarke
& Carpenter ATTORNEYS

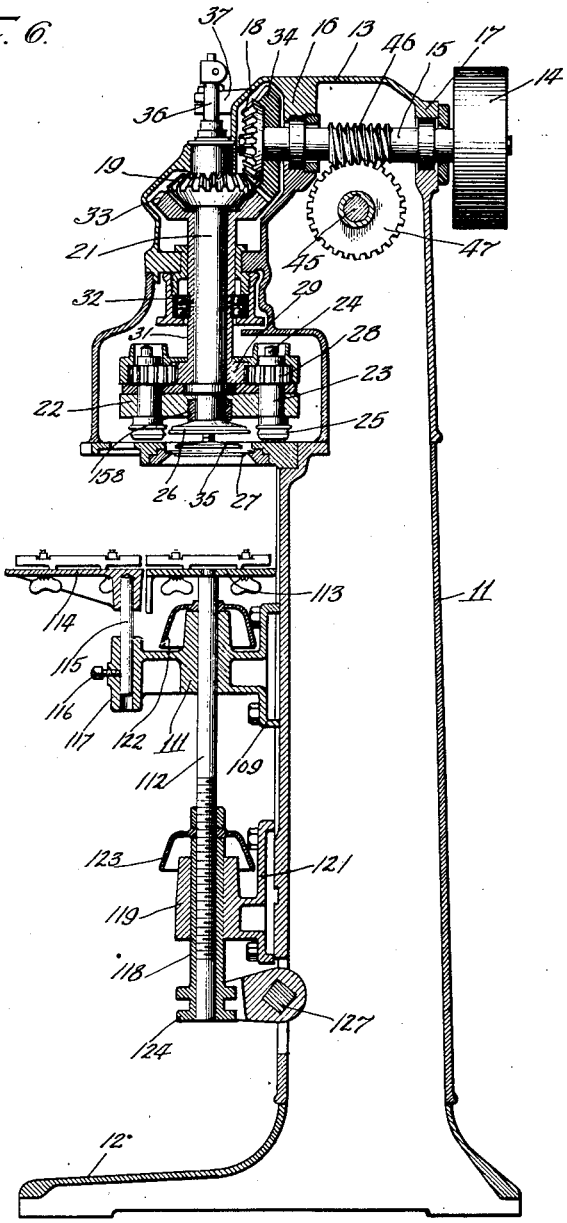

Aug. 23, 1927.  
F. HUNTAR  
1,639,945  
SEMIAUTOMATIC CAN CLOSING MACHINE  
Filed May 21, 1924  
7 Sheets-Sheet 6
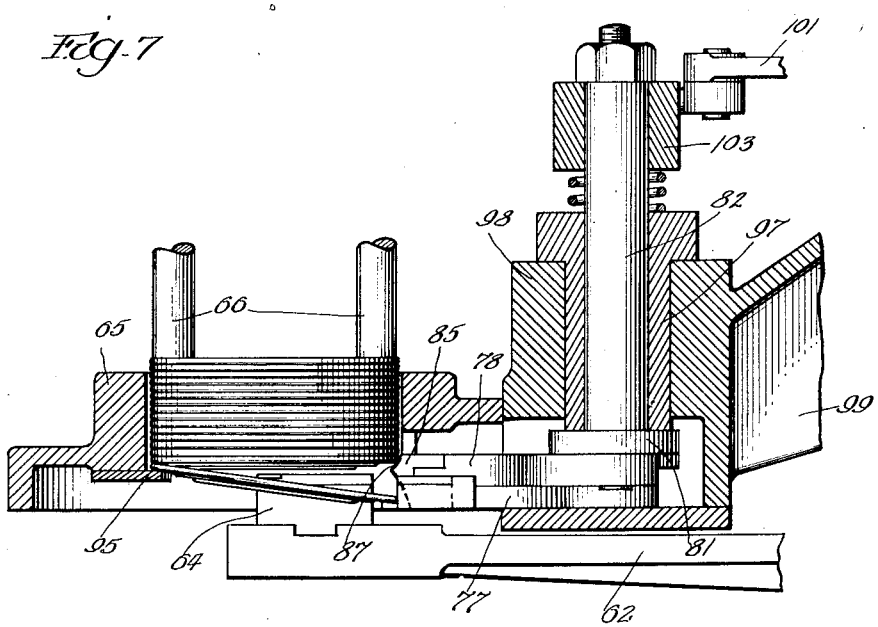
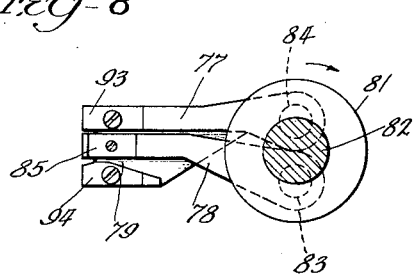
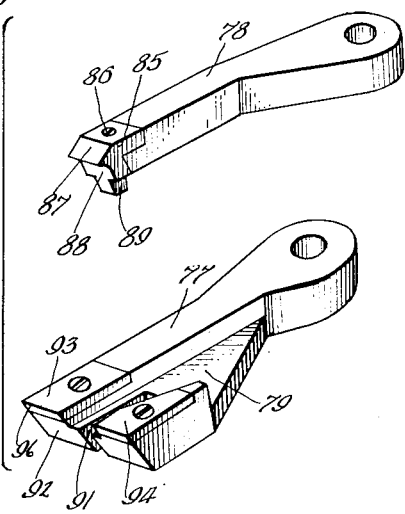
INVENTOR.  
Felix Huntar  
BY Munday, Clarke  
& Carpenter ATTORNEYS Aug. 23, 1927.
F. HUNTAR
1,639,945
SEMIAUTOMATIC CAN CLOSING MACHINE
Filed May 21, 1924    7 Sheets-Sheet 7
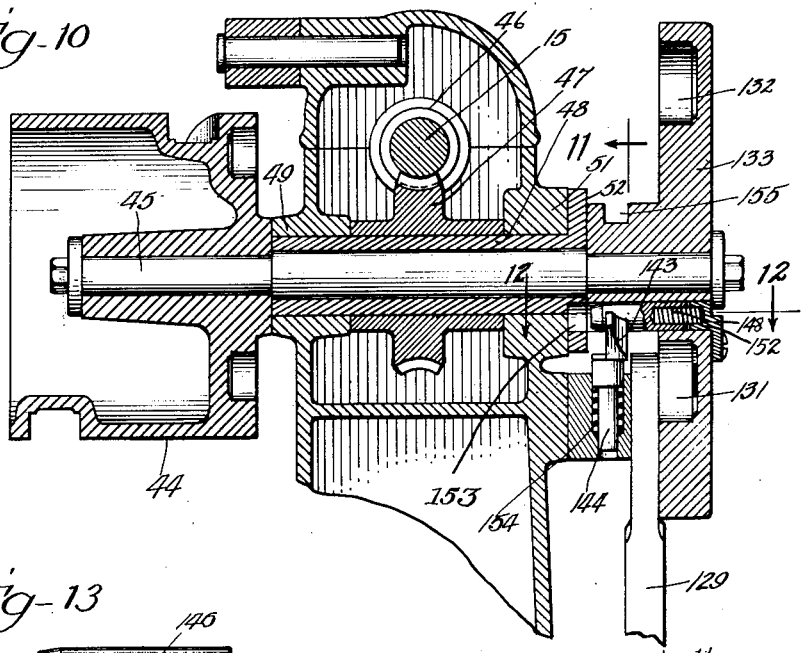
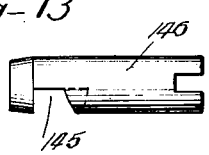
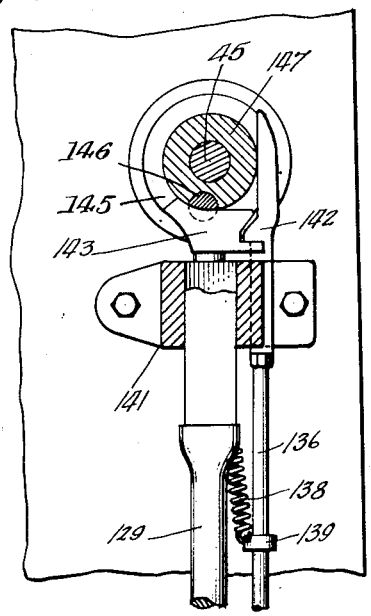
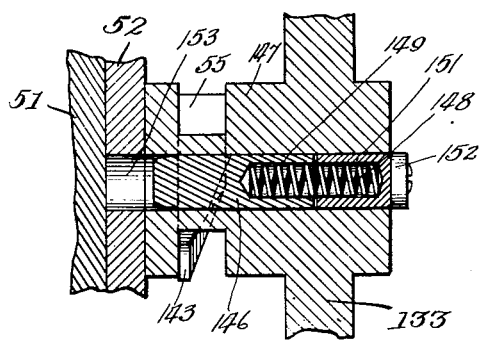
INVENTOR.
Felix Huntar
BY Munday, Clarke &
Carpenter ATTORNEYS Patented Aug. 23, 1927.

1,639,945

UNITED STATES PATENT OFFICE.

FELIX HUNTAR, OF HILLSIDE, NEW JERSEY, ASSIGNOR TO AMERICAN CAN COMPANY, OF NEW YORK, N. Y., A CORPORATION OF NEW JERSEY.

SEMIAUTOMATIC CAN-CLOSING MACHINE.

Application filed May 21, 1924. Serial No. 714,979.

The general object of the present invention is to provide a semi-automatic can closing machine, particularly adapted for use in canning factories in which particular products are packed in relatively small quantities so that containers of a variety of different sizes are required, the machine being adapted for use without substantial change of parts for the various sizes employed.

Closing machines employed in large factories, which operate upon a large number of cans in a single run, are highly perfected mechanically and are of fully automatic action, requiring very little handling by the operator, either of the can or cover. This type of machine is very efficient, but of necessity is too expensive for use in smaller factories and, furthermore, cannot be readily changed to operate upon cans of different size. My invention provides a machine which can be constructed at relatively low cost and which lends itself advantageously to the general use required in the type of factory referred to above.

Another object of the invention is to provide, in a machine of this character, a cover feeding device of novel and efficient action adapted to automatically separate the covers from a stack and transfer them to position in axial alignment with the seaming mechanism to be united with can bodies, which, in the present instance, are positioned by hand upon a lift beneath said mechanism.

A further and important object of the invention is the provision of means for automatically stopping the operation of the machine after completion of a complete seaming operation upon a single can, provision being made, however, for continuous operation if this be desired.

Numerous other objects and advantages of the invention will be apparent as it is better understood from the following description, which, taken in connection with the accompanying drawings, discloses a preferred embodiment thereof.

Referring to the drawings,

Fig. 6 is a front-to-back sectional view, taken substantiallly on the section line 6—6 of Fig. 4;

Fig. 7 is an enlarged sectional detail of the can end feeding mechanism, being taken substantially on the line 7—7 in Fig. 4;

Fig. 8 is a plan view of the feeding fingers in assembled relationship;

Fig. 9 is a perspective view of said fingers in separated relationship;

Fig. 10 is an enlarged sectional view, taken substantially on the line 10—10 of Fig. 4;

Fig. 11 is a detail view, partially in section and partially in elevation, being taken substantially along the line 11—11 in Fig. 10 and illustrating the clutch operating means;

Fig. 12 is an enlarged sectional view, taken substantially on the line 12—12 in Fig. 10 and showing more in detail the housing of the clutch pin;

Fig. 13 is a detail view of said clutch pin;

Figure 1:
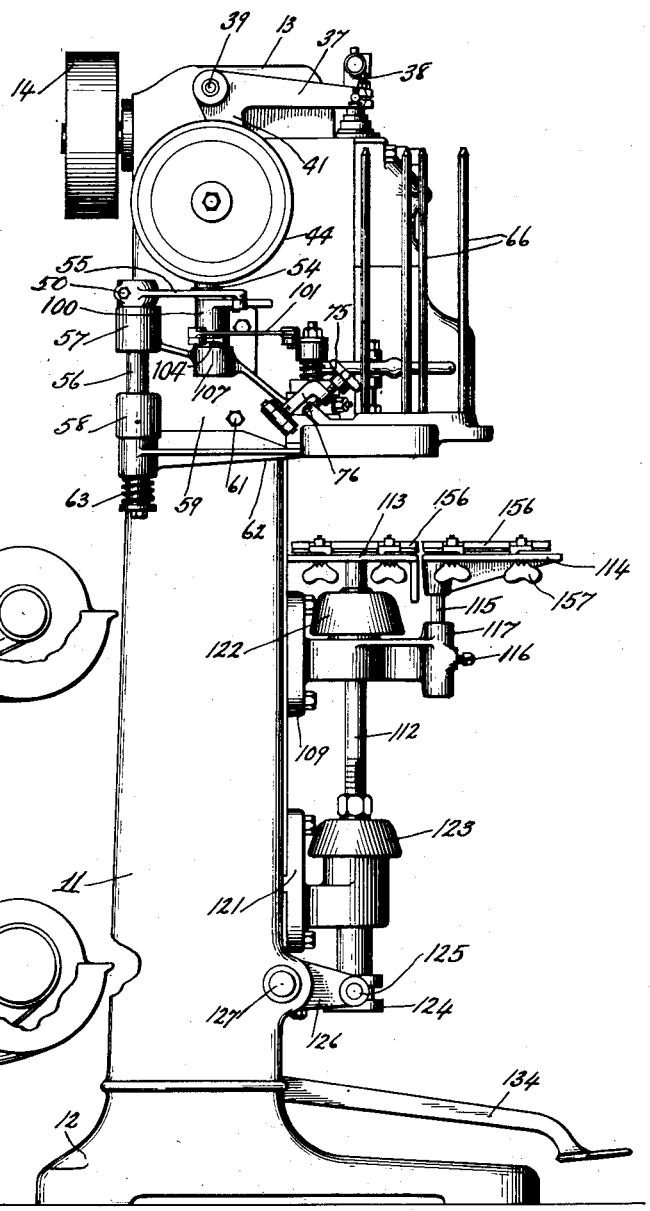
Figure 1 is a side elevation of a closing machine in which my invention is embodied.

The machine as illustrated is of compact construction, the operating parts being supported by a frame standard 11, having a base portion 12 and a head portion 13 in which the seaming head and most of the other operating parts are mounted.

Power is supplied to the machine through the medium of a pulley 14 secured to the outer end of a shaft 15, which has bearings 16 and 17 in the head portion of the frame.

Said shaft carries at its inner end a beveled gear 18, meshing with a similar gear 19 carried by a spindle 21 to which is secured, at its lower end, a seaming head 22. Said seaming head has a plurality (in the present instance four) of sleeves 23 journaled therein and eccentrically journaled within each sleeve is a spindle 24 carrying at its lower end a seaming roll 25 adapted to cooperate with a chuck 26 to seam the covers 27 to the can bodies in the well-known double seam, two of said rolls being first operation rolls and two second operation rolls. The head 22 obviously is rotated by the mechanism just described and the sleeves 23 are separately rotated at desired speed by means of spur gears 28 formed at the upper ends thereof and meshing with a spur gear 29 formed in the lower end of the two-part sleeve 31 surrounding the spindle 21 and journaled in a bearing cage 32, said sleeve being adapted to be rotated by means of a bevel gear 33 meshing with a bevel gear 34 secured to the shaft 15 adjacent the gear 18. The gearing just described is so timed that the eccentrically mounted seaming rolls 25 move inwardly at the proper time during rotation of the seaming head 22 so that the first operation rolls loosely roll the flanges of the can cover and body together and the second operation rolls flatten and tightly close the seam.

The covers, after they are attached, are disengaged from the chuck 26 by means of a knock-out pad 35 carried at the lower end of a rod 36 slidably mounted in the spindle 21. Said rod is actuated by means of a lever 37 connected to the upper end thereof by means of a link 38 and pivoted to the frame at 39, said lever having a downwardly extending arm 41 carrying a roller 42 engaging in a cam groove 43 formed in the inner face of a cylinder cam 44 carried upon one end of a transverse shaft 45 (see Figs. 1, 2 and 10). A worm 46 upon the shaft 15 meshes with a worm wheel 47 secured to a sleeve 48 journaled for rotation in bearings 49 and 51 in the frame, said sleeve having an end flange 52 disposed on the exterior of said bearing 51. The cross shaft 45 hereinbefore referred to is journaled within the sleeve 48 and is adapted to be driven thereby through a clutch mechanism to be later described.

Figure 2:
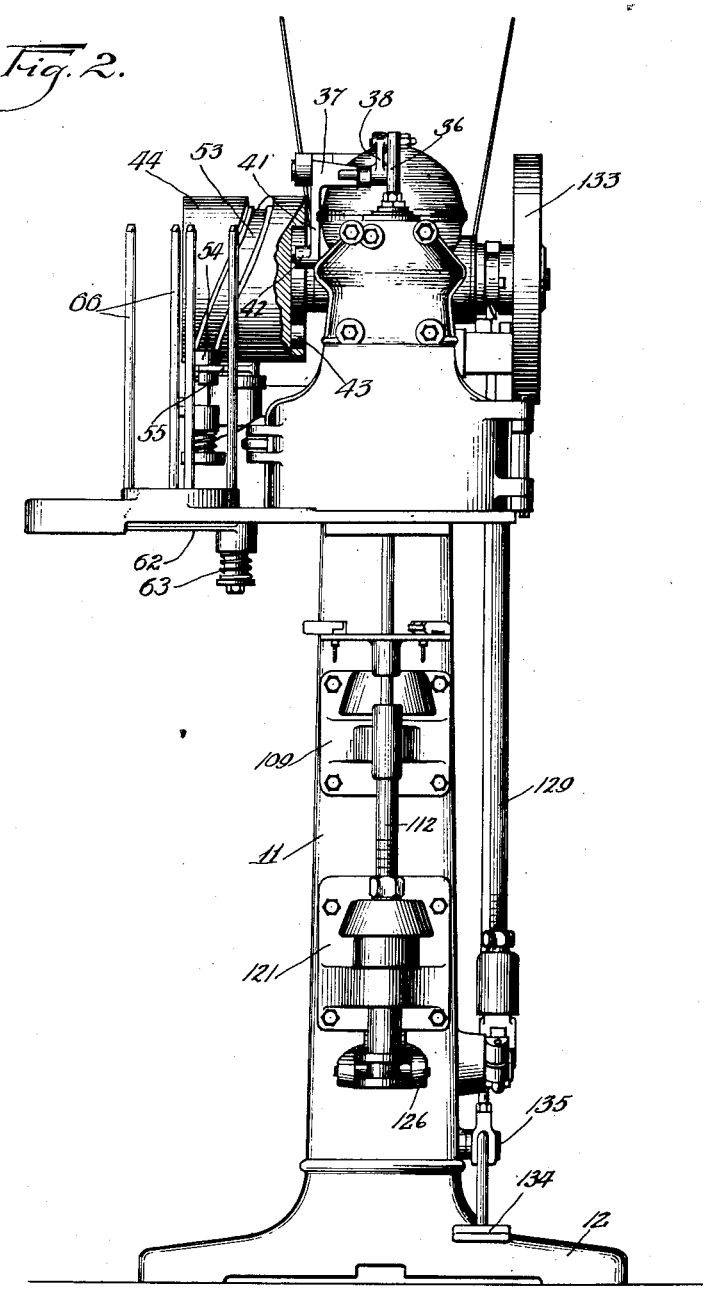
Fig. 2 is a front elevation of the same, partly broken away for better illustration of certain of the operating parts.
Figure 4:
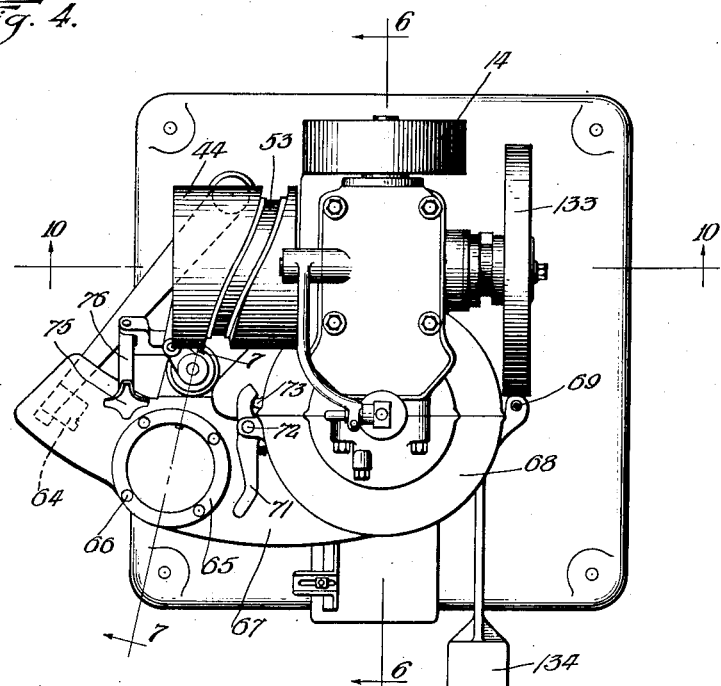
Fig. 4 is a plan view of the machine.
Figure 5:
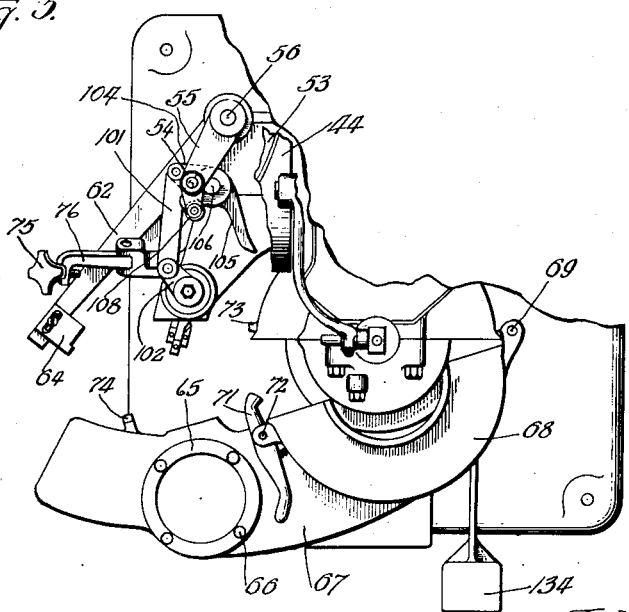
Fig. 5 is a fragmental plan view, showing the end feeding mechanism open for better illustration.

Referring now particularly to Figs. 4 and 5, it will be noted that the cylinder cam 44 is provided with a peripheral groove 53 in which rides a roller 54 carried on the upper side of a lever 55, which is releasably connected at its opposite end by a clamping bolt 50 to a short vertical shaft 56 journaled in bearings 57 and 58 integral with a bracket 59 attached to the side of the head 13 by means of screws 61 (see Fig. 1). A can cover advancing lever 62 is connected to the lower end of said short shaft 56 by means of a spring 63, said lever carrying at its outer end a finger block 64 which normally lies in the plane of the lowermost can end. This lever serves to transfer the covers from a stackholder, indicated by the reference character 65, to position beneath said seaming mechanism when said covers are separated from the stack in manner which will hereinafter appear, and the block 64 is adjustable by a slot and screw connection with the lever 62, as shown in Fig. 5, to properly engage at about the middle of a can end of the determined size. The stack of covers is held in place by rods 66 extending upwardly from the stack holder 65 which is formed integrally with a guide member 67, which in turn is integral with the front protection shield 68 of the seaming head. Said protection shield 68 is pivoted at 69 to the head 13 and is adapted to be opened to permit inspection or removal of the seaming head. A latch 71, pivoted at 72 to one side of said shield, is adapted to engage a projection 73 on the head 13 to hold the shield in closed position, as shown in Fig. 4. A projection 74 upon the guide member 67 is adapted to be engaged by a hand screw 75 carried in a pivoted arm 76 to assist in the locking action.

For the purpose of separating the covers from the stack prior to their being transferred to the seaming mechanism, I provide two fingers 77 and 78, which are shown in detail in Figs. 7, 8 and 9. Said fingers 77 and 78 are assembled as shown in Fig. 8, with the forward part of the finger 78 disposed in a guideway 79 in the finger 77 and both fingers being pivoted at their rear ends to a flange 81 on the lower end of a short vertical shaft 82, the pivot points being indicated respectively by the reference characters 83 and 84. The finger 78 has a block 85 secured to the forward end thereof by means of a screw 86, said block being formed with a downwardly and forwardly curved upper portion 87 and a downwardly and rearwardly inclined lower portion 88 therebeneath terminating in a projection 89 adapted to be disposed within a recess 91 in the finger 77, whereby to guide and limit the movement of said finger 78. The finger 77 has a rearwardly inclined forward edge 92 and is provided with inset blocks 93 and 94 at the top thereof. The stack of covers is normally supported at one side by a ledge 95 and the forwardly hooked portion 87 of the finger 78. Upon rotation of the shaft 82, said finger 78 is withdrawn and the finger 77 is simultaneously projected so that the upper edges 96 of the blocks 93 and 94 enter between the lowermost can end and the one next above it, supporting the remainder of the stack while said lowermost cover is deposited in advance of the finger block 64 on the cover advancing lever 62. Continued rotation of said shaft 82 causes the finger 77 to be withdrawn and the finger 78 again projected to support the stack, the lever 62 being simultaneously swept forward to carry the cover to position beneath the seaming head.

The flanged collar 97 upon the shaft 82 is journaled in a bearing 98 integral with a web 99 projecting from the bracket 59 which is secured to the side of the head 13. Said shaft is adapted to be oscillated by means of a lever 101, connected by an arm 102 with a collar 103, which is spring connected to the upper end of said shaft (see Figs. 5 and 7).

Said lever 101 (see Figs. 1 and 5), is connected to an arm 104 projecting from a sleeve 100 mounted on a short vertical shaft 106 journaled in a bearing 107 in the bracket 59. A cam arm 105, formed integrally with said sleeve 100, receives its motion from a roller 108 carried on the end of the lever 55, which is actuated by engagement of the roller 54 in the groove 53 of the cylinder cam 44. Through the mechanism just described, the lever 101 is actuated to oscillate the shaft 82 and thereby operate the feeding fingers 77 and 78 in proper relation to the action of the cover advancing lever 62.

Secured to the front side of the frame standard 11 is a bracket 109 formed with a central hub 111, through which extends a rod 112, carrying at its upper end a can supporting table 113 (see Fig. 6). Adjacent the supporting table 113 is a can receiving table 114, which is supported upon a rod 115 adjustably held by means of a set screw 116 in a boss 117 formed in the outer part of the bracket 109. Said table 114 may thus be vertically adjusted to accommodate cans of different height, as may also the table 113 which is threaded in a sleeve 118 slidably held in a boss 119 formed in a bracket 121 secured to the front side of the frame standard 11 beneath the bracket 109. Dome-shaped hoods 122 and 123 are positioned upon the rod 112 above the bosses 111 and 119, respectively.

Figure 3:
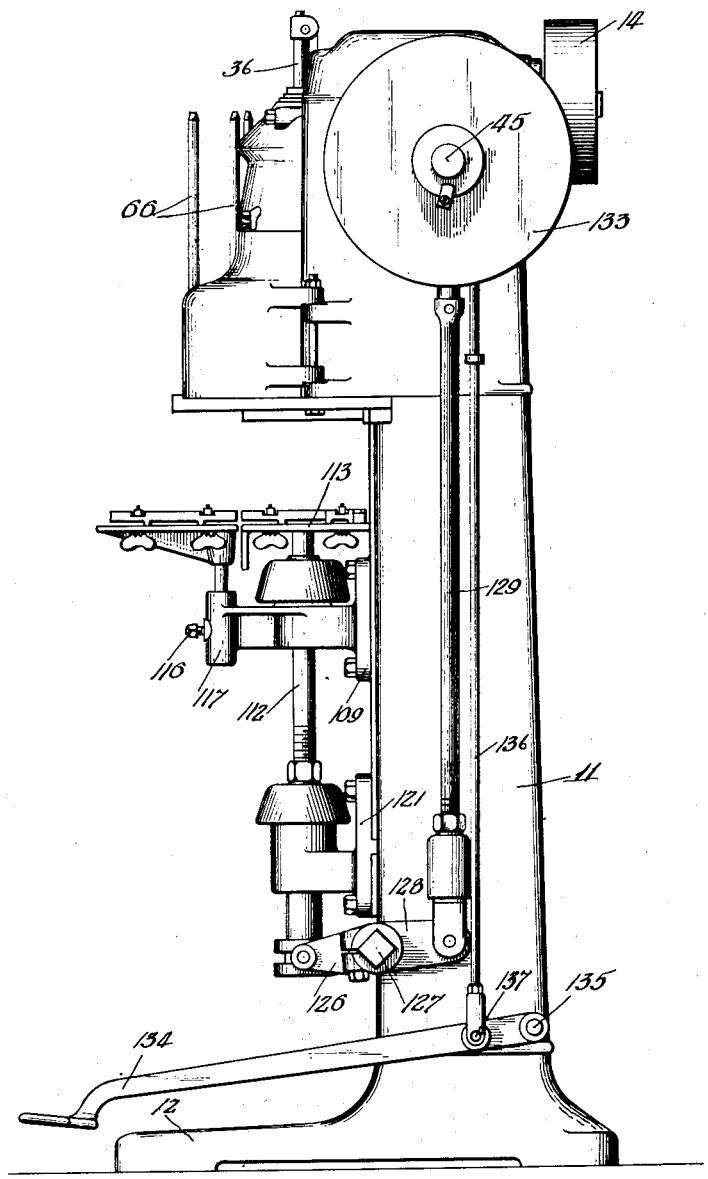
Fig. 3 is a side elevation of the machine, viewed from the side opposite from that of Fig. 1.

At the lowermost extremity of the sleeve 118, I provide a grooved collar 124, engaged by rollers 125 carried by a bifurcated lever 126 secured to a shaft 127 having bearings in the frame. Said shaft is adapted to be rocked by means of an arm 128, connected at its rear end with a rod 129, which carries at its upper end a roller 131 riding in a groove 132 in a cam 133 secured to the shaft 45 at the end thereof opposite the cylinder cam 44 (see Figs. 3 and 10). It will thus be seen that rotation of said shaft 45 produces, through the instrumentalities just described, a reciprocating motion of the supporting table, or lift, 113 causing the latter to raise the can to be closed against the cover previously positioned beneath the seaming head and to present the assembled can and cover to the seaming rollers, whereby the double seaming operation is performed. The cycle of the machine is such that the can is held in raised position for merely a sufficient length of time to complete the seaming operation, after which the table, or platform 113 descends, lowering the can away from the seaming mechanism and permitting its removal from the machine.

I provide means whereby the action of the machine is automatically terminated after a single cycle of operation, or, in other words, after completion of the seaming of a single can. The machine is thrown into operation by depressing a foot lever 134, pivoted at 135 to the side of the frame 11 at the rear thereof, said lever having a rod 136 pivoted thereto at the point 137 forwardly from the pivot point 135. Said rod is adapted to actuate a clutch mechanism which will now be described, reference being had particularly to Figs. 10 to 13, inclusive. The rod 136 is normally held in raised position by means of a spring 138, connected at one end to a collar 139 on the said rod and at the opposite end to a block 141 forming a guideway for the lever 129 and said rod 136. A hook member 142 on the upper end of said rod is engaged with a cam yoke 143 secured to a spring pressed plunger 144. When the rod 136 is moved downwardly by depressing the foot lever 134, the yoke 143 is withdrawn from a groove 145 in a clutch pin 146 slidably mounted in a hub 147 formed integrally with the cam 133. Said pin 146, upon being released, is moved inwardly by means of a spring 148 disposed in a slot 149 in the rear end of said pin and in a slot 151 in a cap 152 secured to the outer face of the cam 133. Upon being moved inwardly, said pin enters a recess 153 in the flange 52 of the sleeve 48, whereby the motion of said sleeve is transmitted to the cam 133 and thereby to the shaft 45. Upon completion of one cycle of operation, the clutch pin 146 is withdrawn by means of the cam yoke 143, which is urged upwardly by a spring 154, surrounding the rod 144. The correspondingly inclined bases of said yoke member and the groove 145 of said pin 146 cooperate to withdraw said pin and break the operative connection between the rotating sleeve 48 and the mechanism actuated by the cams 133 and 44. If continuous operation of the machine be desired, this may, of course, be accomplished by holding the foot lever 134 down and feeding the cans in succession to the seaming mechanism. In normal operation, however, the clutch pin 146 is withdrawn after one revolution of the shaft 45, the yoke 143 being held in a groove 155 in the hub 147 and adapted to engage and withdraw the pin 146, unless said foot lever be depressed, thereby holding said yoke member down against the tension of the spring 154 and out of engagement with the groove 145 in said pin 146.

Adjustable guides 156 are held upon the upper surfaces of the tables 113 and 114 by means of thumb-screws 157 and are adapted to cooperate with the cover guide 67 to centralize the cans and covers in axial alignment with the chuck 26 of the seaming head 22. Said thumb-screws 157 permit adjustment of said guideways to accommodate cans of varying size.

Figure 14:
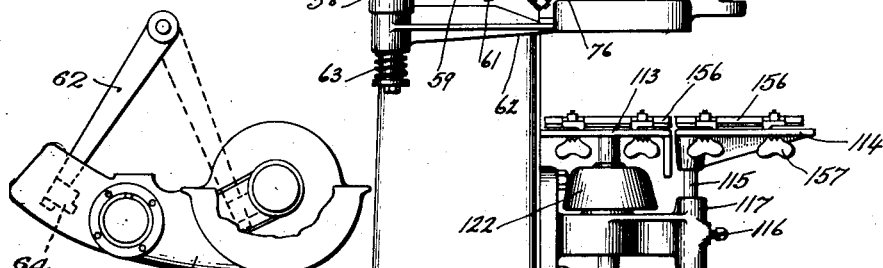
Fig. 14 is a plan view, partially broken away, of the guide member change part for small size covers and showing also the cover advancing lever.
Figure 15:
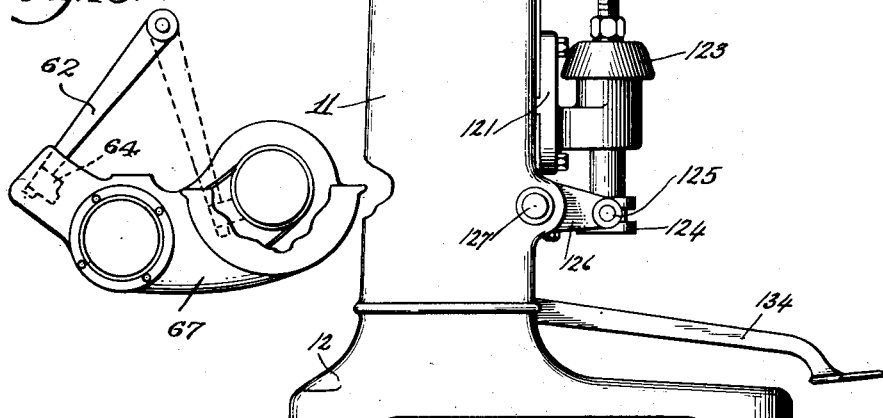
Fig. 15 is a similar view, showing the guide member change part for larger size covers and illustrating the different length of the cover advancing lever stroke when the larger covers are being fed.

It will be apparent from the foregoing that the machine of my invention may be readily adapted to operate upon the cans of different size by merely changing the stack holder and guide member 67 and by changing the seaming head 22 in the usual manner. The change part 67 is shown in Figs. 14 and 15 in two different sizes and it will be noted, from inspection of these figures, that the cover advancing lever 62 may be of the same size, regardless of the size of the covers and may be adjusted to different positions, as shown in said Figs. 14 and 15, by releasing the clamp on the arm 55.

For the purpose of removing the seaming head, a nut 158 is unscrewed, the chuck 26 removed and the sleeve 31 slid off the spindle 21. A new seaming head may then be substituted for the one removed, it being understood that the seaming heads are exchanged in this manner in all machines adapted for operation upon cans of different size. The only additional change of parts required in the machine of my invention is in the stack holder and guide 67, as heretofore stated.

The stack of covers in the stack holder 65 is so arranged that no change in relation to the separating fingers 77 and 78 is necessary for different sizes of covers.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A semi-automatic can closing machine, comprising seaming mechanism, means for feeding covers from a stack on the machine to position beneath said mechanism and above a can body, said means including an adjustable advancing lever independent of the stack support adapted to accurately engage and position covers of different size, and means for presenting an assembled can and cover to said seaming mechanism.

2. A semi-automatic can closing machine, comprising a seaming mechanism, means for presenting an assembled can and cover to said mechanism for closing, a replaceable stackholder and guide member for the covers, and a lever independent of the can cover support for feeding the covers from a stack in said holder to the seaming station.

3. A semi-automatic can closing machine, comprising seaming mechanism, means for presenting an assembled can and cover to said mechanism for closing, a replaceable stackholder and guide member for the covers, and a lever independent of the can cover support for feeding the covers from a stack in said holder to the seaming station, said means being adaptable to the size of the covers for which the stackholder and guide member is adapted.

4. A semi-automatic can closing machine, comprising a seaming head, means for automatically feeding can covers to position beneath said seaming head and above a can positioned at the seaming station, a stackholder and guide for said covers, means for lifting the assembled can and cover to said seaming head, means carried by said seaming head for uniting the cover to the can, and means for automatically stopping the action of the machine after predetermined seaming action, said stackholder and guide being removable to permit substitution of corresponding parts to accommodate can ends of different size.

5. A semi-automatic can closing machine, comprising a seaming head, means for feeding can covers to cans positioned beneath said seaming head, a cover stackholder, means for separating individual covers from a stack in said holder and an adjustable lever for delivering the same to said cover feeding means, means for guiding the covers as they are moved to seaming position, said stackholder and guiding means being removable to permit substitution of corresponding parts to accommodate covers of different size and said cover separating and feeding means being adapted to operate upon different size covers.

6. A semi-automatic can closing machine, comprising a seaming head, means for feeding can covers to cans positioned beneath said seaming head, a cover stackholder, means for separating individual covers from a stack in said holder and delivering the same to said cover feeding means, and means for guiding the covers as they are moved to seaming position, said stackholder and cover guide being constructed as a removable unit to permit substitution for covers of different size and said cover separating and feeding means being adapted to operate upon different size covers.

7. A semi-automatic can closing machine, comprisig seaming mechanism, means for lifting manually positioned cans to said mechanism, a cover stackholder, means for automatically separating individual covers from the bottom of a stack in said holder, and an adjustable lever for transferring the separated covers to said seaming mechanism, said separating and transferring means being operable in synchronism and adapted to separate and feed covers of different diameter.

8. A semi-automatic can closing machine, comprising seaming mechanism, means for lifting manually positioned cans to said mechanism, a cover stack holder, means for automatically separating individual covers from the bottom of a stack in said holder, and means for transferring the separated covers to said seaming mechanism, said transferring means comprising an oscillating arm, a rock shaft upon which said arm is adjustably mounted in order that the position of the arm may vary to permit the transfer of ends of different size without requiring a change of parts.

9. A semi-automatic can closing machine, comprising seaming mechanism, means for presenting an assembled can and cover to said mechanism for closing, a cover stack holder, means comprising a plurality of pivoted fingers alternately projectable toward the stack for separating individual covers from said stack and positioning them for transfer, and means for feeding the separated covers to the seaming station.

FELIX HUNTAR.